UNITED STATES PATENT OFFICE.

WILHELM BOEHM, OF BERLIN, GERMANY.

METHOD OF PRODUCING FIREPROOF MATERIALS FROM QUARTZ AND THE LIKE.

1,099,113.  Specification of Letters Patent.  Patented June 2, 1914.

No Drawing.  Application filed October 30, 1913.  Serial No. 798,374.

*To all whom it may concern:*

Be it known that I, WILHELM BOEHM, a subject of the Emperor of Germany, residing at Berlin, Germany, have invented new and useful Improvements in Method of Producing Fireproof Materials from Quartz and the like, of which the following is a specification.

This invention relates to the production of blocks, vessels or the like by melting quartz or other forms of silicic acid or substances such as zirconium oxid by means of electricity.

The processes hitherto employed require a considerable expenditure of heat for the purpose of reducing the quartz to a fluid state. By the present invention the energy employed, viz., that of the electric current is far more serviceably utilized owing to its concentration.

According to the present invention the sand quartz zircon or the like to be melted is covered with a volatile electrically conductive substance. For this purpose diluted soda or potash lye has been found particularly suitable.

An electric current is switched on and takes a prescribed course through the soda lye or the like, and within a few seconds heats the sand quartz or zircon to such a degree that these themselves become conductors and are very quickly reduced to a fluid state. The auxiliary conductor then evaporates. It is also possible by means of the current passing through or some other source of heat to keep the material if necessary still longer in a liquid state and to mold it.

One form of the invention consists in forming the objects to be produced from quartz sand or the like, the molded material being mixed or covered with a conductive substance such as soda or potash lye.

When the current is switched on the mass at once begins to act conductively and to melt under reduction of the current resistance, until the mass is completely melted. When the current is switched off the molten mass hardens very quickly and then forms objects produced from quartz or the like.

The employment, particularly of soda lye or potash lye has the advantage that in consequence of their low boiling point these substances are quickly evaporated by the heat of the material to be smelted. The invention is adapted for melting such oxids containing elements of the silicon group as silicon oxid, zirconium oxid, titanium oxid, cerium oxid and thorium oxid.

Having now particularly described and ascertained the nature of my said invention and in what manner the same is to be performed, I declare that what I claim is:

1. The herein described method of melting an oxid of an element of the silicon group comprising treating the material to be melted to render it electrically conductive, and then heating it to the melting point by passing an electric current therethrough.

2. The herein described method of melting an oxid of an element of the silicon group comprising associating with the material to be melted a volatile, electrically conductive, substance and passing a current of electricity therethrough.

3. The herein described method of melting an oxid of an element of the silicon group comprising associating with the material to be melted a caustic alkali solution and passing a current of electricity therethrough.

4. The herein described method of melting zirconia comprising treating said material to render it electrically conductive and then heating it to a melting temperature by passing an electric current therethrough.

5. The herein described method of melting zirconia comprising associating therewith a volatile, electrically conductive, substance and passing a current of electricity therethrough.

6. The herein described method of melting zirconia comprising associating therewith a caustic alkali solution and passing a current of electricity therethrough.

7. The herein described method of producing articles from an oxid of an element of the silicon group comprising associating with the selected material a volatile, electrically conductive, substance, passing a current of electricity therethrough to heat the oxid sufficiently to render it electrically conductive, said oxid being melted by the continued action of the electric current thereon and the added electrically conductive substance being volatilized by the heat generated during the melting, and molding the molten material.

In testimony whereof I affix my signature in presence of two witnesses.

WILHELM BOEHM.

Witnesses:
 HENRY HASPER,
 WOLDEMAR HAUPT.